United States Patent
Shieh et al.

(10) Patent No.: US 10,234,922 B2
(45) Date of Patent: Mar. 19, 2019

(54) POWER DISTRIBUTION FOR MOBILE DEVICES

(71) Applicant: Google LLC, Mountain View, CA (US)

(72) Inventors: Eric Richard Shieh, San Ramon, CA (US); Andrea Cawili Gumacal, San Francisco, CA (US); Sam Huynh, San Jose, CA (US); Jong Hyeop Kim, San Francisco, CA (US); Adam Hicklin, Boulder Creek, CA (US); Pratyus Patnaik, Los Altos, CA (US); George Patrick Siu, San Francisco, CA (US); Terence Kwan, Cupertino, CA (US); Min Sung, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 146 days.

(21) Appl. No.: 15/202,265

(22) Filed: Jul. 5, 2016

(65) Prior Publication Data

US 2017/0336846 A1 Nov. 23, 2017

Related U.S. Application Data

(60) Provisional application No. 62/338,138, filed on May 18, 2016.

(51) Int. Cl.
| | |
|---|---|
| G06F 1/26 | (2006.01) |
| G06F 1/28 | (2006.01) |
| G06F 13/42 | (2006.01) |

(52) U.S. Cl.
CPC ............... *G06F 1/28* (2013.01); *G06F 1/266* (2013.01); *G06F 13/4282* (2013.01)

(58) Field of Classification Search
CPC ......... G06F 1/28; G06F 13/4282; G06F 1/266
See application file for complete search history.

(56) References Cited

U.S. PATENT DOCUMENTS

| | | |
|---|---|---|
| 8,028,188 B2 | 9/2011 | Karthikeyan et al. |
| 8,775,113 B2 | 7/2014 | Powers et al. |

(Continued)

FOREIGN PATENT DOCUMENTS

| | | |
|---|---|---|
| CN | 202617147 | 12/2012 |

OTHER PUBLICATIONS

'www.toptenreviews.com' [online] "USB Hubs: Daisy Chaining, Bandwith and Power Demands," Oct. 8, 2010 [retrieved on Sep. 27, 2016], Retrieved from Internet URL<http://www.toptenreviews.com/computers/articles/usb-hubs-daisy-chaining-bandwidth-and-power-demands/> 6 pages.

'en.wikipedia.org' [online] "USB Hub," Dec. 27, 2015, [retrieved on Feb. 24, 2017] Retrieved from Internet: URL<https://web/archive/org/web/20151227213048/https://en.wikipedia.org/wiki/USB_hub#Power> 4 pages.

(Continued)

*Primary Examiner* — Idriss N Alrobaye
*Assistant Examiner* — Ronald T Modo
(74) *Attorney, Agent, or Firm* — Fish & Richardson P.C.

(57) ABSTRACT

Methods, systems, and apparatus, including computer programs encoded on a computer storage medium, for performing tests on mobile devices. In one aspect, a power distribution system includes a set of mobile devices and a computer that manages the execution of a test using the set of mobile devices. The computer can include one or more data communication ports. The system can also include one or more Universal Serial Bus (USB) hubs connected to the mobile devices using USB cables. Each mobile device can be connected to one of the one or more USB hubs. The system can also include one or more USB charging hubs connected between each data communication port of the computer and at least one of the one or more USB hubs. The system can also include a power supply connected between a power source and each of the one or more USB hubs.

18 Claims, 5 Drawing Sheets

(56) References Cited

U.S. PATENT DOCUMENTS

| | | | |
|---|---|---|---|
| 8,909,842 | B2 | 12/2014 | Johnson |
| 9,189,378 | B1 | 11/2015 | Ryan et al. |
| 2006/0140125 | A1 | 6/2006 | Ottinger et al. |
| 2007/0088967 | A1 | 4/2007 | Fu et al. |
| 2007/0156940 | A1* | 7/2007 | Zmudzinski ............ G06F 8/656 |
| | | | 710/240 |
| 2009/0192752 | A1* | 7/2009 | Powers ............... G06F 11/2733 |
| | | | 702/117 |
| 2010/0146307 | A1* | 6/2010 | Griffin, Jr. .............. G06F 1/263 |
| | | | 713/300 |
| 2010/0205463 | A1* | 8/2010 | Magnusson ............. G06F 1/266 |
| | | | 713/300 |
| 2011/0151860 | A1 | 6/2011 | Yu et al. |

OTHER PUBLICATIONS

'en.wikipedia.org' [online] "USB," Jun. 20, 2012 [retrieved on Nov. 13, 2014] Retrieved from Internet: URL<http://en.wikipedia.org/w/index.php?title=USB&oldid=498557873> 33 pages.

'www.usb.org' [online] "Battery Charging Specification, Revision 1.2," Mar. 15, 2012, [retrieved on Jan. 22, 2016] Retrieved from Internet: URL<http://www.usb.org/developers/docs/devclass_docs/BC11.2_070312.zip> 72 pages.

Handziski et al. "Twist," Multi-Hop Ad Hoc Networks: from Theory to Reality, May 26, 2006, 8 pages.

International Search Report and Written Opinion issued in International Application No. PCT/US2016/066646, dated Mar. 8, 2017, 19 pages.

Written Opinion issued in International Application No. PCT/US2016/066646, dated Apr. 16, 2018, 7 pages.

* cited by examiner

POWER DISTRIBUTION FOR MOBILE DEVICES

CROSS-REFERENCE TO RELATED APPLICATIONS

This application claims the benefit and priority to, U.S. Provisional Patent Application No. 62/338,138, titled "POWER DISTRIBUTION FOR MOBILE DEVICES," filed on May 18, 2016. The disclosure of the foregoing application is incorporated herein by reference in its entirety for all purposes.

BACKGROUND

A mobile device can include a variety of software and hardware components. For example, smartphones and tablet computing devices can include operating systems, native applications, memory devices, processors, wireless transceivers, and so on. To ensure proper functionality, the software and hardware can be tested on many devices prior to being released for use on, or installed on, the mobile devices.

SUMMARY

This specification describes technologies relating to hardware and software testing.

In general, one innovative aspect of the subject matter described in this specification can be embodied in power distribution systems that include a set of mobile devices; a computer that manages the execution of a test using the set of mobile devices, the computer including one or more data communication ports; one or more Universal Serial Bus (USB) hubs connected to the mobile devices using USB cables, each mobile device being connected to one of the one or more USB hubs; one or more USB charging hubs connected between each data communication port of the computer and at least one of the one or more USB hubs, each USB charging hub providing power to the at least one USB hub that enables data communication between the computer and the mobile devices connected to the at least one USB hub; and a power supply connected between a power source and each of the one or more USB hubs, the power supply providing power for each of the one or more USB hubs and the mobile devices connected to each of the one or more USB hubs. Other embodiments of this aspect include corresponding testing methods, apparatus, and computer programs, configured to perform the actions of the testing methods, encoded on computer storage devices.

These and other embodiments can each optionally include one or more of the following features. In some aspects, the power supply is a customized power supply selected based on power usage of the set of mobile devices. In some aspects, the set of mobile devices includes at least one of (i) a set of smartphones or (ii) a set of tablet computing devices.

In some aspects, the USB charging hub and the power supply stabilizes power to the set of mobile devices. In some aspects, the power supply provides sufficient power to charge batteries of the set of mobile devices during testing.

In some implementations, the one or more data communication ports includes at least one USB Peripheral Component Interconnect (PCI) card. In some aspects, the set of mobile devices, the computer, the one or more USB hubs, the USB charging hub, and the power supply are mounted in a tray of a server rack. Some aspects include a set of lights that indicate errors associated with the mobile devices.

In general, another aspect of the subject matter described in this specification can be embodied in methods that include the actions of receiving data specifying a test to be performed using mobile devices; receiving criteria for the test; selecting one or more test groups based on at least on one of (i) the test or (ii) the criteria for the test, each test group including one or more mobile devices; performing the test using the selected one or more test groups; and providing data specifying results of the test.

Particular embodiments of the subject matter described in this specification can be implemented so as to realize one or more of the following advantages. By maintaining proper power levels to mobile devices, the number of errors that occur during mobile device testing can be reduced. In addition, by maintaining proper power levels for data communication devices, data throughput between the mobile devices and a testing system can be increased. Power systems and USB hub configurations can be adapted to the number and types of devices being tested to ensure sufficient power and data throughput for the devices. Standard rack configurations can be generated for particular devices and/or particular types of devices to increase scalability and reduce design and installation times of mobile device testing racks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
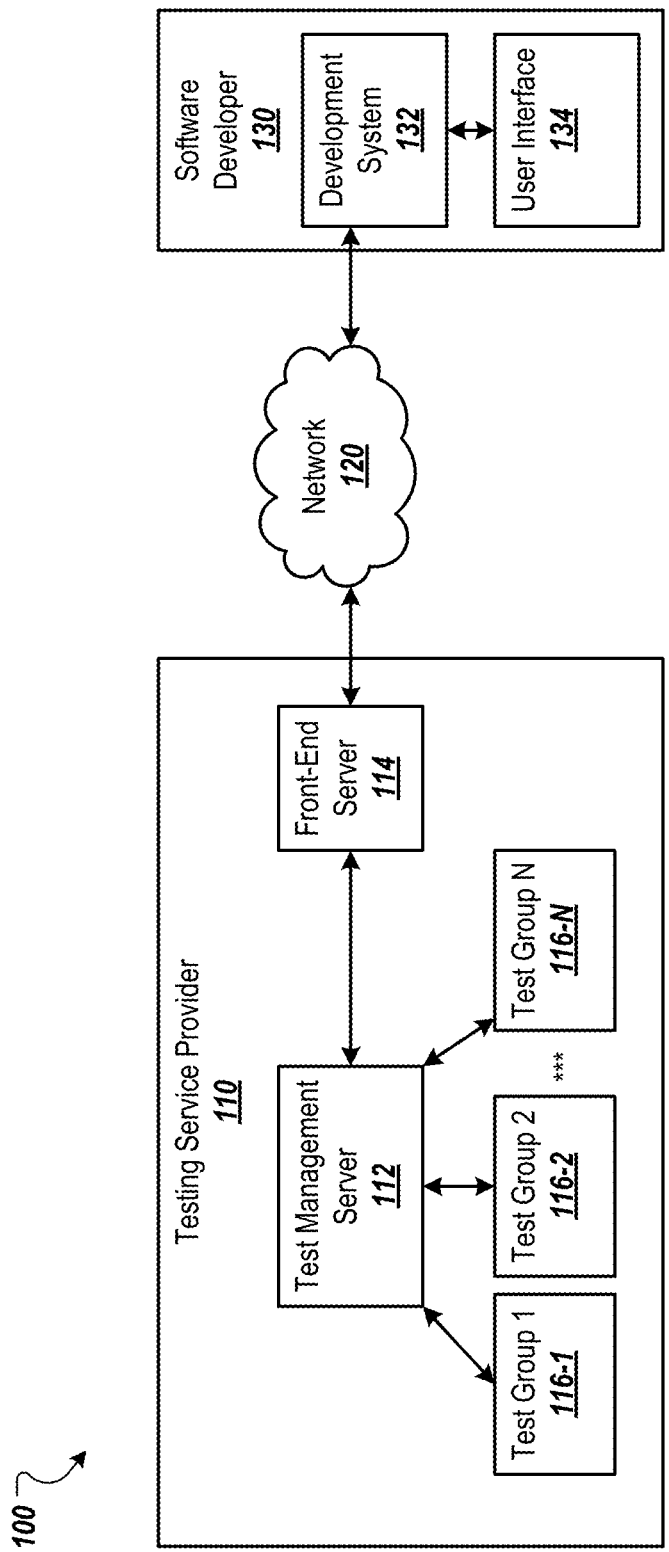
FIG. 1 is an environment in which an example testing service provider tests software and/or hardware on mobile devices.

Mobile device software and hardware can be tested on multiple devices of a same type, e.g., a particular smartphone model, and/or on multiple different types of devices, e.g., smartphones and tablet computing devices that have a same operating system. For example, a new application may be tested on multiple smartphones and/or tablet computing devices prior to being released to the public. A mobile device farm can be used to test software and/or hardware on multiple mobile devices simultaneously and/or in sequence.

Multiple mobile devices can be connected to a server using one or more Universal Serial Bus (USB) hubs. A USB hub includes multiple USB ports for connecting mobile devices. For example, a USB hub can be used to expand the number of USB ports of a server. A USB hub can provide power to mobile devices connected to the USB hub and can also provide data communication between the server and the mobile devices.

A USB hub can be used to connect multiple mobile devices to a server that manages software and/or hardware tests that are performed on the mobile devices. For example, a server may manage the testing of a software application that is executing on mobile devices connected to the server by way of a USB hub. In addition, if a test is to be performed on many devices or many different types of devices, multiple servers can be used to manage the test on a portion of the devices. For example, a first server may manage the test of a software application on ten (or some other number) smartphones of a first type and a second server may manage the test of the software application on ten (or some other number) smartphones of a second type different from the first type. In addition, a third server may manage the test of the software application on ten (or some other number) tablet computing devices. In this way, the testing of software and/or hardware on many different devices and/or different types of devices can be performed simultaneously.

In some implementations, testing servers, USB hubs, and mobile devices can be housed at a data center. For example, a data center may include multiple racks of testing groups. Each testing group can include one or more testing servers, or a server can be used to manage testing for multiple testing groups. Each server can be connected to one or more USB hubs that are each connected to one or more mobile devices that are used to test software and/or hardware installed on the mobile devices. The servers can be connected to a network to receive applications that are to be tested and tests (e.g., automated scripts) to be performed on the software and/or hardware using the mobile devices. For example, a software developer may upload an application and a test to a cloud-based service that includes the racks of testing groups. After the test is completed, the cloud-based service can provide results of the test to the software developer, e.g., by updating a user interface of a device of the software developer to present the results.

Some conventional USB hubs are not adapted to provide enough power to charge mobile devices connected to all of the ports of the USB hubs at the same time. For example, a conventional 16-port USB hub may only be able to charge ten devices at the same time. If more devices are connected to the USB hub than the hub can charge, some devices may not remain charged during a test being performed using the device. In this example, a device may power off, resulting in the test not being completed at that device. In addition, insufficient power to a mobile device or to data communication devices used during the test may result in a loss of data being communicated between the mobile device and the data communication devices.

A testing group can be configured to ensure that sufficient power is provided to each mobile device and that data capacity is sufficient for the mobile devices included in the testing group. The power systems and data communications components can be selected and/or configured based on the type(s) of mobile device(s) included in the testing group, the particular model(s) of mobile device(s) included in the testing group, and/or the number of mobile devices included in the testing group. For example, a testing group that includes tablet computing devices may demand more power than a testing group that includes smartphones. In another example, a testing group with mobile devices that may demand a large amount of bandwidth (e.g., by having a large number of devices) may result in more data communication ports for the server managing the test and/or more USB charging hubs (described below).

FIG. 1 is an environment 100 in which an example testing service provider 110 tests software and/or hardware on mobile devices. The testing service provider 110 includes a test management server 112 and a front-end server 114. The front-end server 114 can receive tests and software applications that are to be tested from software developers, e.g., the software developer 130, over a network 120, e.g., a local area network (LAN), a wide area network (WAN), the Internet, or a combination thereof. The front-end server 114 can also receive tests from other types of users, such as hardware developers that would like to test hardware installed on mobile devices. A test can include routines, automated scripts, or other code that tests software and/or hardware installed on mobile devices. The front-end server 114 can also receive criteria for a test from the software developer (or other user). The criteria can include types or models of mobile devices on which the test is to be performed and/or the number of devices on which the test is to be performed.

The front-end server 114 provides the test and/or the software application to the test management server 112. The test management server 112 manages the performance of the test using one or more testing groups 116-1-116-N. A testing group can include a set of mobile devices, a server that interacts with the mobile devices to manage the test at those mobile devices, power components to ensure that the mobile devices are sufficiently powered throughout the test, and data communication components that provide sufficient bandwidth for data communication between the server of the testing group and the mobile devices of the testing group. Each testing group 116 can include multiple mobile devices of a same type. For example, the testing group 116-1 may include ten tablet computing devices of a particular type (e.g., particular model or particular operating system) and the testing group 116-2 may include twenty smartphones of a particular type (e.g., particular model or particular operating system). In another example, a testing group 116 may include different types of devices.

The test management server 112 can select one or more testing groups for use in performing a test. In some implementations, the test management server 112 may select one or more testing groups based on the test and/or the criteria for the test. For example, the test management server 112 may select the one or more testing groups based on the type of device on which the test is to be performed. The test management server 112 can also select a testing group based on the status of the testing groups 116. For example, the test management server 112 may select one or more testing groups based on the level of charge of the batteries of the mobile devices included in the testing groups and/or the temperature of the mobile devices included in the testing groups. In this example, the test management server 112 may select the testing group(s) that have the highest average battery level among the mobile devices of the testing group(s) and/or the testing group(s) having the lowest average temperature among the mobile devices of the testing group(s). In another example, the test management server 112 may avoid selecting a testing group that has a mobile device that has a battery charge that is less than a threshold amount (e.g., less than 10%) or the testing group that has the mobile device with the lowest battery charge among the test mobile devices in each testing group under consideration.

The test management server 112 can send the test to the server(s) of the selected testing group(s). The server(s) of the selected testing group(s) can then interact with the mobile devices of the testing group(s) to perform the test. For example, the test may include sending data to an application executing on the mobile device and receiving data from the application after the application has processed the data it received from the server. In another example, the data sent to the application may include a command to perform a particular operation and the server may monitor data sent from the mobile device to determine whether the application performed the operation correctly.

In some implementations, the test management server 112 installs a software application to be tested on the mobile devices of the selected testing group(s). For example, the software developer 130 may send to the front-end server 114 a new application, or an updated version of an application, to be tested. The test management server 112 may receive the application from the front-end server 114 and install the application on the mobile devices of the selected testing group(s).

After the test is performed, the test management server 112 can send results of the test to the software developer 130. For example, the results of the test may be presented at a user interface 134 of a development system 132 used to generate the software application and/or another user device.

In some implementations, the components of the testing service provider 110 are housed at one or more data centers. For example, the test management server 112 may be implemented as a rack-mounted server that is mounted in a rack of a data center. In addition, the components of each test group 116 may be mounted in one or more racks of the data center. For example, each test group 116 may include one or more rack-mounted servers and mobile devices installed in trays of the racks.

Figure 2:
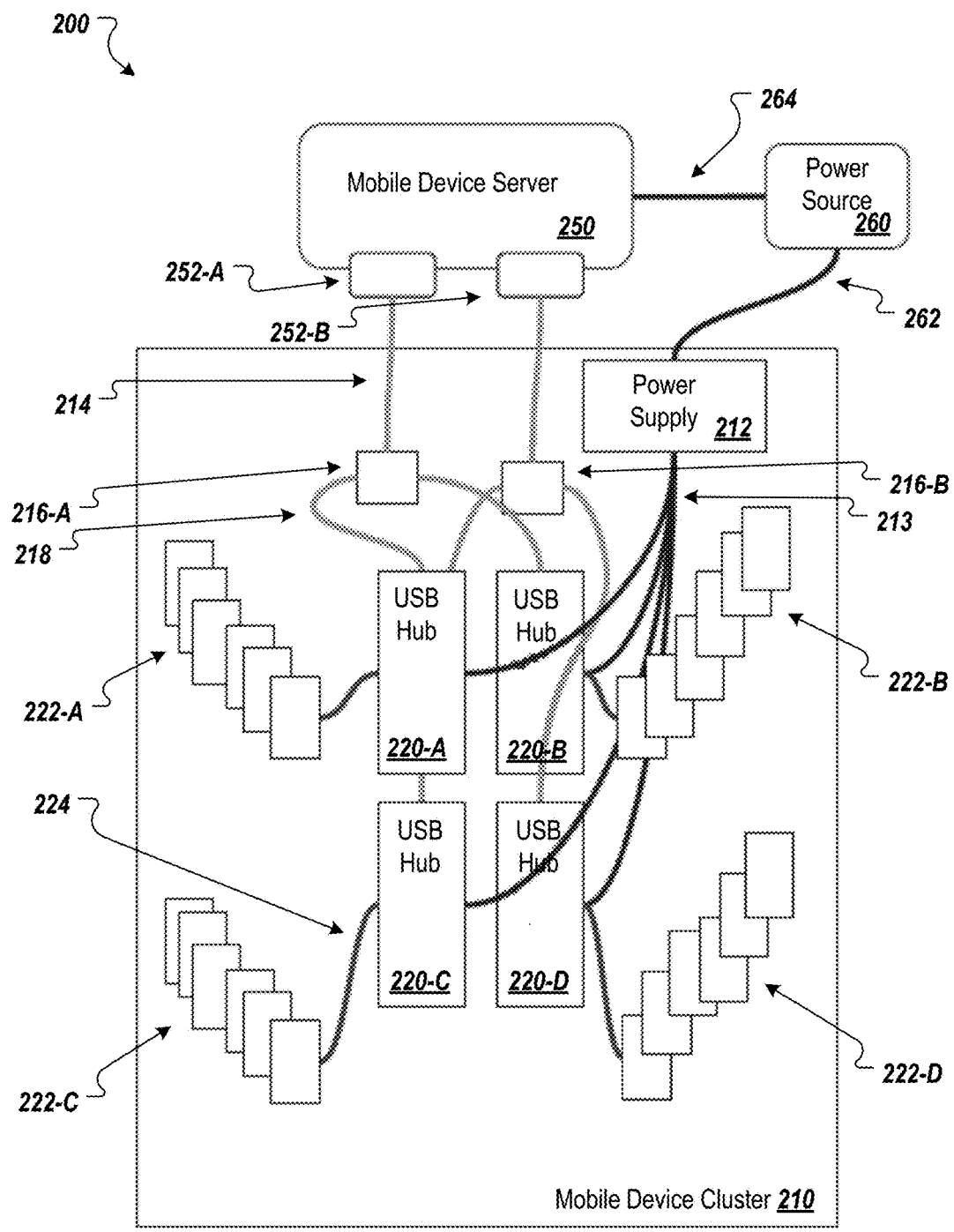
FIG. 2 is an example testing group for testing software and/or hardware on mobile devices.

FIG. 2 is an example testing group 200 for testing software and/or hardware on mobile devices. The example testing group 200 includes a mobile device server 250, a power source 260, and a mobile device cluster 210. The power source 260 provides power to the mobile device server 250 and to a power supply 212 of the mobile device cluster 210. For example, the power source 260 may provide 120 VAC power to the mobile device server 250 and to the power supply 212. The power source 260 provides power to the power supply 212 using a wire harness 262. Similarly, the power source 260 provides power to the mobile device server 250 using a power cable 264.

The mobile device server 250 receives tests to be performed, e.g., from a test management server, and manages the performance of the test on mobile devices of the mobile device cluster 210. The mobile device server 250 includes two data communication ports 252-A and 252-B. The data communication ports 252-A and 252-B enables the mobile device server 250 to communicate with the mobile devices of the mobile device cluster 210. In some implementations, the data communication ports 252-A and 252-B include USB PCI card(s). For example, the mobile device server 250 may include a single USB PCI card that has two ports, multiple USB PCI cards having one or more ports, or another configuration. Although the mobile device server 250 is illustrated as having two data communication ports 252-A and 252-B, the mobile device server 250 can have more or less data communication ports 252-A and 252-B in other implementations.

The number of data communication ports 252 and/or the number of mobile device servers 250 included in a testing group may be based on the amount of data that will be communicated between the mobile device server 250 and the mobile devices of the mobile device cluster 210. For example, servers and data communication ports (e.g., USB PCI cards) often have maximum bandwidth capabilities. If the number of mobile devices and/or the types of mobile devices included in the mobile device cluster 210 exceed the bandwidth of a single data communication port, the mobile device server 250 can include multiple data communication ports 252 and/or the testing group 200 can include multiple mobile device servers 250.

The mobile device cluster 210 includes two USB charging hubs 216-A and 216-B, four USB hubs 220-A-220-D, and, for each USB hub, a set of mobile devices 222A-222-D. The USB charging hubs 216-A and 216-B are connected to the data communication ports 252-A and 252-B, respectively, using USB cables 214. In some implementations, the USB cables 214 are USB 1.1, USB 1.2, or USB 2.0 cables. The USB cables 214 provide power from the mobile device server 250 to the USB charging hubs 216-A and 216-B. The USB cables 214 also provide data communication between the data communication ports 252-A and 252-B and the USB charging hubs 216-A and 216-B.

In some implementations, the USB charging hubs 216-A and 216-B are implemented as USB B.C. 1.1 or USB B.C. 1.2 hubs. For example, each USB charging hub 216-A and 216-B may include a charging port that meets at least one of the USB B.C. 1.1 or USB B.C. 1.2 standards. These charging ports may provide more current than other types of USB ports that the USB charging hubs 216-A and 216-B may have. The USB charging hub 216-A is connected to USB hub 220-A and USB hub 220-B using USB cables 218 (e.g., USB 1.1, 1.2, or 2.0 cables). Similarly, the USB charging hub 216-B is connected to USB hubs 220-C and 220-D using USB cables (e.g., USB 1.1, 1.2, or 2.0 cables). The USB hub 220-A may be connected to the charging port of the USB charging hub 216-A and the USB hub 220-B may be connected to the charging port of the USB charging hub 216-B.

As described below, the USB charging hubs 216-A and 216-B ensure that enough power is provided to the USB hubs 220-A-220-D for data communication between the data communication ports 252-A and 252-B and the mobile devices 222. In some implementations, the only devices connected to the USB charging hubs 216-A and 216-B are the USB hubs 220-A-220-D to ensure sufficient power for the USB hubs 220-A-220-D. For example, a USB B.C. charging hub may include one or more charging ports and one or more other USB ports. The USB hubs 220-A and 220-B may be connected to respective charging ports of the USB charging hub 216-A, while any remaining ports of the USB charging hub 216-A are not used, e.g., are not connected to any other devices.

In some implementations, the number of USB charging hubs 216-A and 216-B included in the mobile device cluster 210 is based on the on the amount of data that will be communicated between the mobile device server 250 and the mobile devices of the mobile device cluster 210. For example, the mobile device cluster 210 may include more USB charging hubs for higher amounts of required or expected bandwidth. In some implementations, the mobile device cluster 210 may include a USB charging hub for each data communication port 252 of the mobile device server 250 that is being used for testing software and/or hardware using the mobile devices 222 (e.g., for each data communication port connected to the USB hubs 220).

Each USB hub 220-A-220-D is connected to a respective set of mobile devices 222-A-222-D using USB cables (e.g., USB 2.0 cables). In general, each USB hub 220-A-220-D may include the same number of mobile device 224. In this way, the amount of power to each USB hub 220-A-220-D and to each mobile device 224 can be balanced. In this example, the USB hubs 220-A-220-D can be implemented as 7-13 port hubs (or another appropriate number of ports).

The power supply 212 provides direct current (DC) power to the USB hubs 220-A-220-D using a wire harness 213. In some implementations, the power supply 212 provides more power to the USB hubs than would be provided by a USB-based power supply. For example, the power supply 212 can be selected or configured based on the amount of power that the mobile devices 222 and the USB hubs 220 are expected to consume. In this example, a larger power supply may be used in implementations having a larger number of mobile devices. In a particular example, the power supply 212 may be capable of providing approximately twice as much power as the USB hubs 220-A-220-D, the mobile devices 222, and any other devices connected to the power supply 212 are expected to consume.

The power provided by the power supply 212 can be routed to the ports of the USB hub 220-A-220-D and to the mobile devices 222A-222D to charge the batteries of the mobile devices 222A-222D. In this way, the mobile devices 222A-222D do not draw power from the data communication ports 252A-252B. In addition, the power supply 212 can provide a constant, stable amount of power that stabilizes the power to the mobile devices 222A-222D.

The combination of the power supply 212 and the USB charging hubs 216-A and 216-B ensures that the power to the mobile devices 222A-222D is sufficient and stable to keep the batteries of the mobile devices 222A-222D charged throughout tests. The USB charging hubs 216A and 216B also ensure that there is sufficient power along the USB paths for data communication purposes.

The wire harness 213 can provide better power management through the use of a single power supply 212 per a particular number of USB hubs rather than using multiple power supplies. In addition, consolidating the USB hubs' power supply into a single power supply 212 reduces the amount of heat generated within a mobile device rack or tray.

The type and size of the USB cables used to connect particular types of components can be based on the power demand of the components and the data throughput between the components. For example, to provide stable power to the mobile devices, the amount of power dissipated by the USB cables should be as low as practicable. Thus, a USB 2.0 cable may be used instead of a USB 1.0 cable between the USB hubs 220 and the mobile devices 222. In addition, keeping the lengths of the cables as short as practicable allows for lower power dissipation.

In some implementations, the testing group 200 includes one or more wireless access points, e.g., connected to the mobile device server 250. For example, the test may require the software and/or hardware being tested to send and/or receive data wirelessly. The wireless access point can be connected to an external network, e.g., the Internet, via additional network components, e.g., a modem.

The testing group 200 can be installed in a tray of a server rack. For example, a data center can include multiple racks that each include multiple trays with testing groups. In this way, testing groups can be used to test software and hardware using a variety of mobile devices.

Each rack and/or each tray can include a set of lights, e.g., LEDs, for indicating errors to users. For example, a rack may include a strip of LEDs that indicate trays that have an error. The LEDs may have different colors so that errors can be color coded. For example, one color may indicate a USB failure, while another color indicates a wi-fi failure. In this way, a person at the data center can quickly locate trays and devices that have errors or that have failed.

The example testing group 200 can be one of several standard testing group configurations. By having standard configurations with proper power distribution and data throughput, reliable testing groups can be quickly and easily installed in data centers. Some other example testing groups are described below with reference to FIGS. 2-4.

Figure 3:
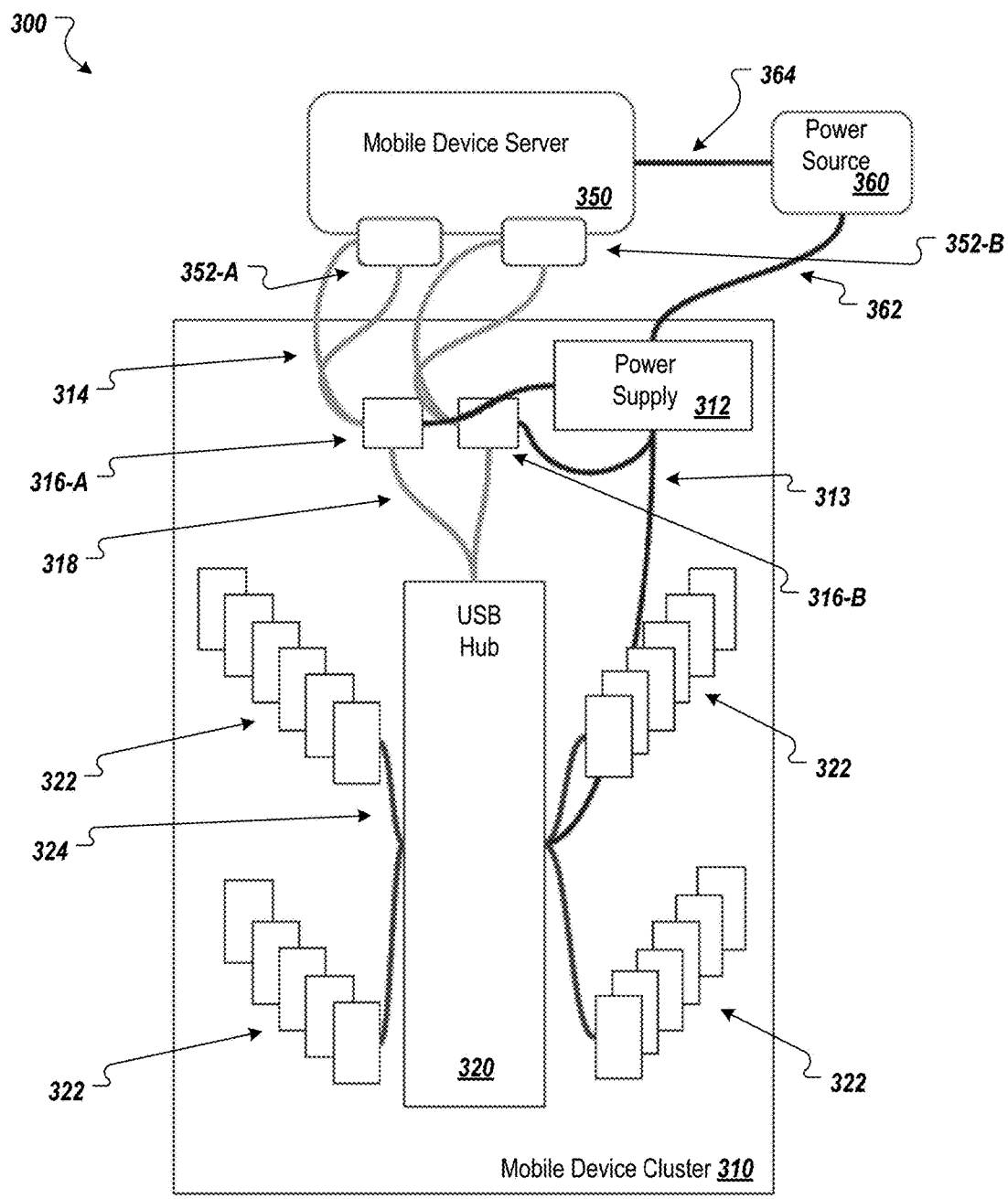
FIG. 3 is another example testing group for testing software and/or hardware on mobile devices.

FIG. 3 is another example testing group 300 for testing software and/or hardware on mobile devices. The testing group 300 has many of the same components as the testing group 200 of FIG. 2. For example, the testing group 300 includes a mobile device server 350, a power source 360, and a mobile device cluster 310. However, the testing group 300 includes only a single USB hub 320.

The power source 360 provides power to the mobile device server 350 and to a power supply 312 of the mobile device cluster 310. For example, the power source 360 may provide 120 VAC power to the mobile device server 350 and to the power supply 312. The power source 360 provides power to the power supply 312 using a wire harness 362. Similarly, the power source 360 provides power to the mobile device server 350 using a power cable 364.

The mobile device server 350 receives tests to be performed, e.g., from a test management server, and manages the performance of the test on mobile devices of the mobile device cluster 310. The mobile device server 350 includes two data communication ports 352-A and 352-B. The data communication ports 352-A and 352-B enables the mobile device server 350 to communicate with the mobile devices of the mobile device cluster 310. In some implementations, the data communication ports 352-A and 352-B include USB PCI card(s). For example, the mobile device server 350 may include a single USB PCI card that has two ports, multiple USB PCI cards having one or more ports, or another configuration. Although the mobile device server 350 is illustrated as having two data communication ports 352-A and 352-B, the mobile device server 350 can have more or less data communication ports 352-A and 352-B in other implementations. Similar to the example testing group 200, the number of data communication ports 352 and/or the number of mobile device servers 350 included in a testing group may be based on the amount of data that will be communicated between the mobile device server 350 and the mobile devices of the mobile device cluster 310.

The mobile device cluster 310 includes two USB charging hubs 316-A and 316-B, a single USB hub 320, and a set of mobile devices 222. The USB charging hubs 316-A and 316-B are connected to the data communication ports 352-A and 352-B, respectively, using USB cables 314. In some implementations, the USB cables 314 are USB 1.1, USB 1.2, or USB 2.0 cables. The USB cables 314 provide power from the mobile device server 350 to the USB charging hubs 316-A and 316-B. The USB cables 314 also provide data communication between the data communication ports 352-A and 352-B and the USB charging hubs 316-A and 316-B.

In some implementations, the USB charging hubs 316-A and 316-B are implemented as USB B.C. 1.1 or USB B.C. 1.2 hubs. The USB charging hub 316-A is connected to the USB hub 320 using a USB cable 318 (e.g., USB 1.1, 1.2, or 2.0 cable). Similarly, the USB charging hub 316-B is connected to the USB hub 320 using a USB cable (e.g., USB 1.1, 1.2, or 2.0 cables). The USB charging hubs 316-A and 316-B ensure that enough power is provided to the USB hub 320 for data communication between the data communication ports 352-A and 352-B and the mobile devices 322. In some implementations, as described above, the number of USB charging hubs 316-A and 316-B included in the mobile device cluster 310 is based on the on the amount of data that will be communicated between the mobile device server 350 and the mobile devices of the mobile device cluster 310.

In this example, the USB hub 320 can include a particular number of USB ports, e.g., 30 ports, and each data communication port 352-A and 352-B can communicate with half of the USB ports. For example, mobile devices connected to one half of the USB ports may communicate with the mobile device server 350 by way of the USB charging hub 316-A and the data communication port 352-A. The mobile devices connected to the other half of the USB ports may communicate with the mobile devices server 350 by way of the USB charging hub 316-B and the data communication port 352-B. In other example implementations, there may be more data communication ports and the USB ports of the USB hub 320 may be divided up evenly between the data communication ports of the mobile device server 350. For example, if the mobile device server 350 includes three data communication ports, a third of the USB ports may be assigned to each data communication port. As described above, additional data communication ports may be added to support increased bandwidth demands of the mobile devices 322. The mobile device cluster 310 can include a USB charging hub 316 for each data communication port of the mobile device server 350.

Figure 4:
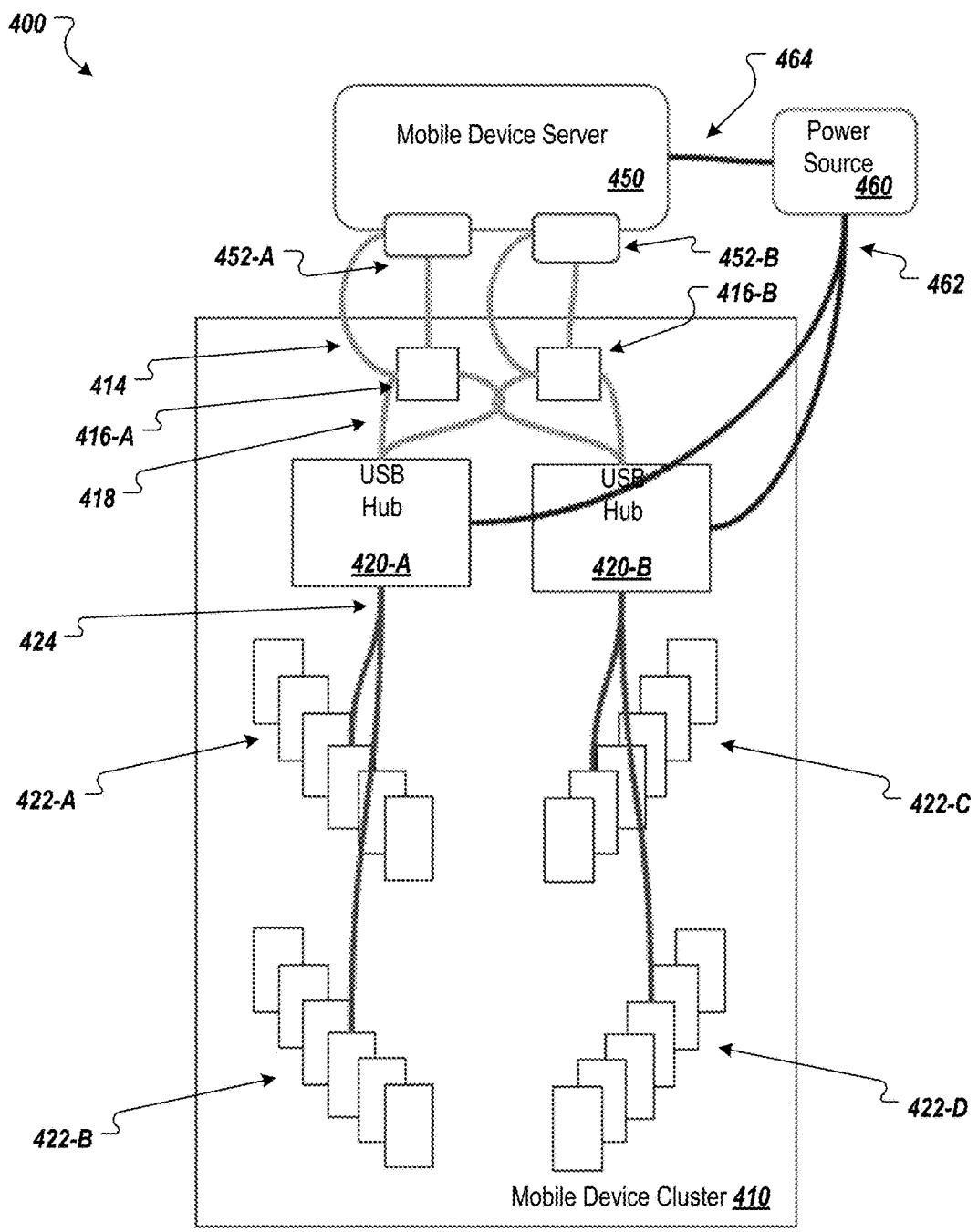
FIG. 4 is another example testing group for testing software and/or hardware on mobile devices.

FIG. 4 is another example testing group 400 for testing software and/or hardware on mobile devices. The testing group 400 has many of the same components as the testing group 200 of FIG. 2. For example, the testing group 400 includes a mobile device server 450, a power source 460, and a mobile device cluster 410. However, the testing group 400 includes two USB hubs 420A-420-B that are each connected to mobile devices 422.

The power source 460 provides power to the mobile device server 450 and to a power supply 412 of the mobile device cluster 410. For example, the power source 460 may provide 120 VAC power to the mobile device server 450 and to the power supply 412. The power source 460 provides power to the power supply 412 using a wire harness 462. Similarly, the power source 460 provides power to the mobile device server 450 using a power cable 464.

The mobile device server 450 receives tests to be performed, e.g., from a test management server, and manages the performance of the test on mobile devices of the mobile device cluster 410. The mobile device server 450 includes two data communication ports 452-A and 452-B. The data communication ports 452-A and 452-B enables the mobile device server 450 to communicate with the mobile devices of the mobile device cluster 410. In some implementations, the data communication ports 452-A and 452-B include USB PCI card(s). For example, the mobile device server 450 may include a single USB PCI card that has two ports, multiple USB PCI cards having one or more ports, or another configuration. Although the mobile device server 450 is illustrated as having two data communication ports 452-A and 452-B, the mobile device server 450 can have more or less data communication ports 452-A and 452-B in other implementations. Similar to the example testing group 200, the number of data communication ports 452 and/or the number of mobile device servers 450 included in a testing group may be based on the amount of data that will be communicated between the mobile device server 450 and the mobile devices of the mobile device cluster 410.

The mobile device cluster 410 includes two USB charging hubs 416-A and 416-B, a single USB hub 420, and a set of mobile devices 422. The USB charging hubs 416-A and 416-B are connected to the data communication ports 452-A and 452-B, respectively, using USB cables 414. In some implementations, the USB cables 414 are USB 1.1, USB 1.2, or USB 2.0 cables. The USB cables 414 provide power from the mobile device server 450 to the USB charging hubs 416-A and 416-B. The USB cables 414 also provide data communication between the data communication ports 452-A and 452-B and the USB charging hubs 416-A and 416-B.

In some implementations, the USB charging hubs 416-A and 416-B are implemented as USB B.C. 1.1 or USB B.C. 1.2 hubs. The USB charging hub 416-A is connected to the USB hub 420-A using a USB cable 418 (e.g., USB 1.1, 1.2, or 2.0 cable). Similarly, the USB charging hub 416-B is connected to the USB hub 420-B using a USB cable (e.g., USB 1.1, 1.2, or 2.0 cables). The USB charging hubs 416-A and 416-B ensure that enough power is provided to the USB hubs 420-A and 420-B for data communication between the data communication ports 452-A and 452-B and the mobile devices 422A-422-D. In some implementations, as described above, the number of USB charging hubs 416-A and 416-B included in the mobile device cluster 410 is based on the on the amount of data that will be communicated between the mobile device server 450 and the mobile devices of the mobile device cluster 410.

In this example, two USB cables are connected between each data communication port 452 and each USB charging hub 416. Similarly, two USB cables are connected between each USB charging hub 416 and each USB hub 420. The number of USB cables connected between these components can vary based on the amount of bandwidth used by the mobile devices 422 and the amount of bandwidth each data communication port 452 can handle. In this example, each data communication port 452 includes at least two ports, one for each USB cable. The mobile devices 422 can are divided into four groups and each group can be assigned to a single data communication port such that the mobile devices 422 of each group do not exceed the maximum bandwidth of its assigned port.

Although the example test groups of FIGS. 2-4 include USB charging hubs, other testing groups can be configured without the USB charging hubs. For example, if the data communication ports are USB 3.0 PCI cards and the USB hubs are USB 3.0 hubs, the USB charging hubs may be removed. In this configuration, multiple I/O channels on the USB PCI cards can handle concurrent connections from the hardware side instead of using a software driver, resulting in the software/driver side being stable without USB charging hubs.

Figure 5:
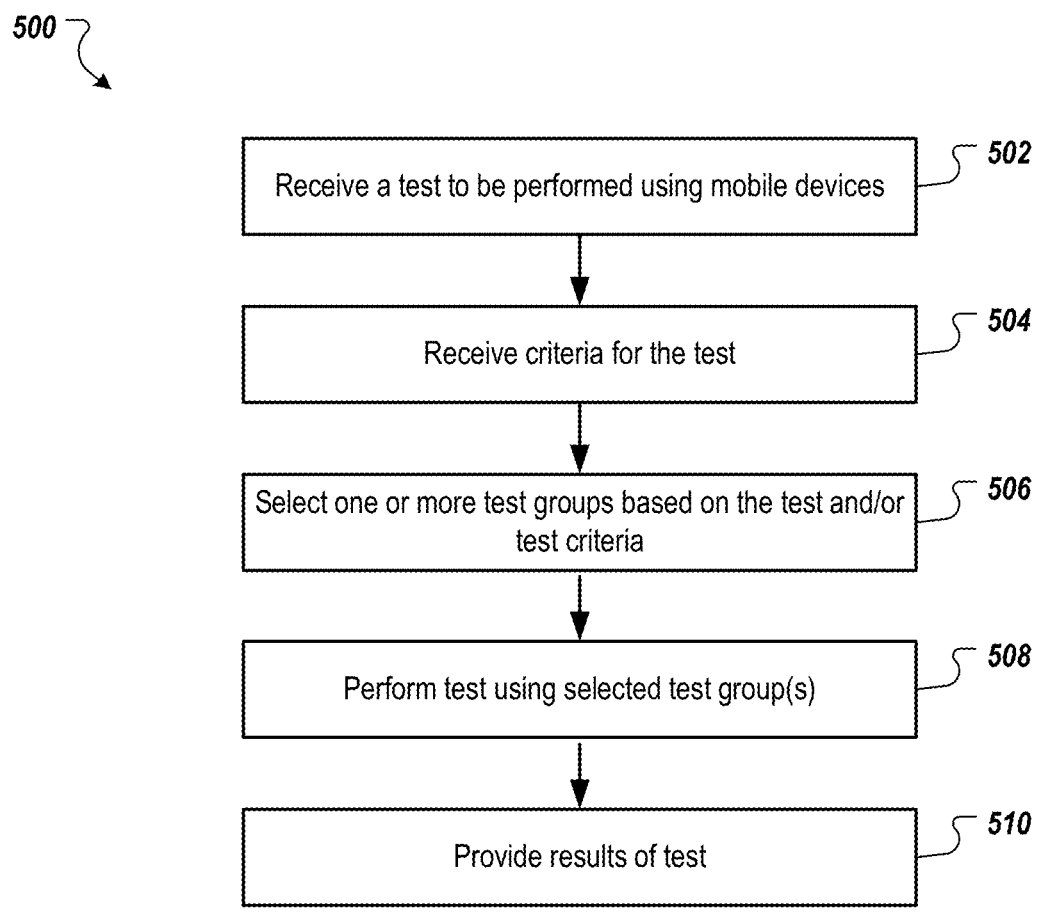
FIG. 5 is a flow chart of an example process for performing a test on mobile devices.

FIG. 5 is a flow chart of an example process 500 for performing a test using mobile devices. Operations of the process 500 can be implemented, for example, by a data processing apparatus, such as the test management server 112 of FIG. 1. The process 500 can also be implemented by instructions stored on computer storage medium, where execution of the instructions by a data processing apparatus cause the data processing apparatus to perform the operations of the process 500.

A test to be performed using mobile devices is received (502). The test may include routines, scripts, or other code for testing hardware and/or software installed on mobile devices. The test may be received from a client device or development system of a user, e.g., of a software developer.

Criteria for the test is received (504). The criteria can specify the type and/or number of mobile devices on which to test the hardware and/or software. For example, the criteria may specify tablet computing devices, smartphones, devices that have a particular operating system, particular models of mobile devices, or other appropriate criteria.

One or more test groups are selected based on the test and/or the test criteria (506). For example, if the criteria specifies a particular model of smartphones, one or more test groups that include the particular model of smartphones may be selected. The test groups may also be selected based on the statute of the test groups and/or the status of the mobile devices of the test groups. For example, the test groups that satisfy the test criteria and that have devices with higher levels of battery charge and/or devices having a lower temperature may be selected.

The test is performed using the selected test group(s) (508). For example, a mobile device server of each selected test group may manage the performance of the test on the mobile devices of the test group. During the test, the mobile device server may send data and/or commands to the mobile devices and receive data from the mobile devices. As described above, the data may be communicated between the mobile device server and the mobile devices via an arrangement of USB hubs and USB charging hubs.

Results of the test are provided (510). Results of the test may be logged during the testing based on data received from the mobile devices used to perform the test. The results may then be sent to a user device for presentation. For example, a user interface of the user device may be updated to present the results of the test.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A power distribution system, comprising:
   a set of mobile devices;
   a computer that manages the execution of a test using the set of mobile devices, the computer comprising one or more data communication ports;
   one or more Universal Serial Bus (USB) hubs connected to the mobile devices using USB cables, each mobile device being connected to one of the one or more USB hubs;
   one or more USB charging hubs connected between each data communication port of the computer and at least one of the one or more USB hubs, each USB charging hub providing (i) power to the at least one USB hub that enables data communication between the computer and the mobile devices connected to the at least one USB hub and (ii) data communication between the computer and the mobile devices connected to the at least one USB hub; and
   a separate power supply that is separate from the one or more USB charging hubs and that connects an external power source to each of the one or more USB hubs, the power supply providing power for each of the one or more USB hubs and the mobile devices through the one or more USB hubs.

2. The system of claim 1, wherein the power supply is a customized power supply selected based on power usage of the set of mobile devices.

3. The system of claim 1, wherein the set of mobile devices comprises at least one of (i) a set of smartphones or (ii) a set of tablet computing devices.

4. The system of claim 1, wherein the USB charging hub and the power supply stabilizes power to the set of mobile devices.

5. The system of claim 1, wherein the power supply provides sufficient power to charge batteries of the set of mobile devices during testing.

6. The system of claim 1, wherein the one or more data communication ports comprises at least one USB Peripheral Component Interconnect (PCI) card.

7. The system of claim 1, wherein the set of mobile devices, the computer, the one or more USB hubs, the USB charging hub, and the power supply are mounted in a tray of a server rack.

8. The system of claim 7, further comprising a set of lights that indicate errors associated with the mobile devices.

9. The system of claim 1, wherein the power provided to the mobile devices by the power supply is routed to USB ports of the one or more USB hubs.

10. A method, comprising:
    managing, by a computer that includes one or more data communication ports, execution of a test using a set of mobile devices, wherein:
        each mobile device is connected to a USB hub of a set of one or more USB hubs using a USB cable; and each USB hub is connected to a USB charging hub of a set of one or more USB charging hubs and each USB charging hub is connected to a data communication port of the one or more data communication ports;

providing, by each USB charging hub, (i) power to each USB hub connected to the USB charging hub that enables data communication between the computer and the mobile devices connected to the USB hub and (ii) data communication between the computer and the mobile devices connected to the USB hub; and providing, by a separate power supply that is separate from the one or more USB charging hubs, power for each of the one or more USB hubs and the mobile devices through the USB hubs.

11. The method of claim 10, wherein the power supply is a customized power supply selected based on power usage of the set of mobile devices.

12. The method of claim 10, wherein the set of mobile devices comprises at least one of (i) a set of smartphones or (ii) a set of tablet computing devices.

13. The method of claim 10, wherein the USB charging hub and the power supply stabilizes power to the set of mobile devices.

14. The method of claim 10, wherein the power supply provides sufficient power to charge batteries of the set of mobile devices during testing.

15. The method of claim 10, wherein the one or more data communication ports comprises at least one USB Peripheral Component Interconnect (PCI) card.

16. The method of claim 10, wherein the set of mobile devices, the computer, the one or more USB hubs, the USB charging hub, and the power supply are mounted in a tray of a server rack.

17. The method of claim 16, further comprising a set of lights that indicate errors associated with the mobile devices.

18. The method of claim 10, wherein the power provided to the mobile devices by the power supply is routed to USB ports of the one or more USB hubs.

* * * * *

UNITED STATES PATENT AND TRADEMARK OFFICE
CERTIFICATE OF CORRECTION

PATENT NO. : 10,234,922 B2
APPLICATION NO. : 15/202265
DATED : March 19, 2019
INVENTOR(S) : Shieh et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 234 days.

Signed and Sealed this
Tenth Day of December, 2019

Andrei Iancu
*Director of the United States Patent and Trademark Office*